United States Patent
Wang et al.

(10) Patent No.: US 6,402,444 B1
(45) Date of Patent: Jun. 11, 2002

(54) TYPE OF PARALLEL MACHINE TOOL FRAME DRIVEN BY SLIDER AND EXTENSIBLE STRUT

(75) Inventors: Jinsong Wang; Guanghong Duan; Xiaoqiang Tang, all of Beijing (CN)

(73) Assignee: Tsinghua University, Beijing (CN)

( * ) Notice: Subject to any disclaimer, the term of this patent is extended or adjusted under 35 U.S.C. 154(b) by 0 days.

(21) Appl. No.: 09/518,425

(22) Filed: Mar. 3, 2000

(30) Foreign Application Priority Data

Apr. 29, 1999 (CN) .......................................... 99106147 A
Jul. 16, 1999 (CN) .......................................... 99109823 A

(51) Int. Cl.[7] .............................. B23C 1/00; B23Q 1/46; B23Q 1/26
(52) U.S. Cl. ...................... 409/235; 409/201; 409/204; 74/490.1; 74/89.29
(58) Field of Search ................................. 409/235, 201, 409/211, 216, 204; 74/490.08, 490.01, 490.03, 490.07, 89.29, 89.3; 414/917; 901/19, 41

(56) References Cited

U.S. PATENT DOCUMENTS

| | | | | |
|---|---|---|---|---|
| RE28,814 E | * | 5/1976 | Lohneis et al. | 409/221 |
| 4,962,676 A | * | 10/1990 | Vainstock | 74/479 |
| 5,401,128 A | * | 3/1995 | Lindem et al. | 409/201 |
| 5,715,729 A | * | 2/1998 | Toyama et al. | 409/201 |
| 5,807,044 A | * | 9/1998 | Watari et al. | 409/216 |
| 5,903,125 A | * | 5/1999 | Prentice et al. | 74/471 XY |
| 5,919,014 A | * | 7/1999 | Weck et al. | 409/201 |
| 5,960,672 A | * | 10/1999 | Pritschow et al. | 74/490.07 |
| 6,099,217 A | * | 8/2000 | Wiegand et al. | 409/201 |
| 6,161,992 A | * | 12/2000 | Holy et al. | 409/201 |
| 6,328,510 B1 | * | 12/2001 | Hanrath et al. | 409/235 |

FOREIGN PATENT DOCUMENTS

| | | | |
|---|---|---|---|
| EP | 0812652 A1 | * | 12/1997 |
| WO | WO 97/22436 A1 | * | 6/1997 |

* cited by examiner

Primary Examiner—A. L. Wellington
Assistant Examiner—Erica E Cadugan
(74) Attorney, Agent, or Firm—Skjerven Morrill LLP

(57) ABSTRACT

This invention belongs to the manufacturing fields, specially relates to the structure design of a type of multi-function parallel machine tool driven by sliders and an extensible strut. It includes: two vertical (or one horizontal) guide ways, two active sliders mounted on guide ways, two linear drive units used to move the active sliders, two struts, one movable platform to assemble cutter, one workbench to fix workpiece, one salve slider and one controlled extensible strut. Compared with traditional machine tools, this invention possesses several advantages such as simpler structure, better cutter dexterity, faster cutter feed rate, higher accuracy, and better thermal effect calibration.

13 Claims, 2 Drawing Sheets

TYPE OF PARALLEL MACHINE TOOL FRAME DRIVEN BY SLIDER AND EXTENSIBLE STRUT

BACKGROUND OF THE INVENTION

This invention belongs to the manufacturing fields, specially relates to the structure design of a type of multi-function parallel machine tool driven by sliders and an extensible strut.

The movement mode of the traditional machine tools is that the cutter and workpiece move along fixed guide ways. However, this mode has inherent limitations. For example, in order to maintain high stiffness and therefore high machining precision, traditional machine tools need bulky machine body, firm column and steadfast guide way systems, which increase weight, manufacturinpg cost and transporting difficulty. Moreover, that the cutter can only feed along, the guide way limits its machining dexterity.

To meet the increasing demand of parts with complex and special shapes, the machine industry adopts all kinds of possible strategies. For instance, more bulky structure and expensive fixtures are used to get stronger machining capability. Such strategies usually result in longer manufacturing period and cost. Furthermore, the machining quality may not be very reliable. Over the years, a new type of parallel machine tools (PMT) has occurred, of which extensible struts substitute traditional fixed guide way systems, and, frame structure substitute heavy machine body, pillar and other components.

The numerical control system of a traditional machine tool is based on Cartesian coordinate, and each guide way system corresponds to one degree of freedom. However, the numerical control system for PMT is based on the controlled axis of PMT, that is, the struts. The lengths of extensible struts or positions of sliders determine the position and orientation of cutter. Therefore PMT can realize the machining task by adjusting the lengths of extensible struts or the positions of sliders. As a new type of manufacturing equipment, PMT changes the mode of relative motion between the cutter and the workpiece, and increases the cutter's movement dexterity. These advantages enable PMT to have more powerful machining ability and higher controlling dexterity.

The representative structures of PMT can be mainly classified into two types. One is the extensible strut type PMT, in which the frame is used as supporting structure. One end of the extensible strut is connected with the node on either top or bottom of the frame, and the other end is connected with the moving platform on which the cutter is fixed. Because of frame-supporting structure, this type of PMT has higher stiffness than traditional machine tools when they have the same machining capability. However, the motions of the extensible struts are coupling, and their lengths vary with the time. Therefore it is difficult to calibrate the thermal effect. Moreover, the structure comprises many special parts which don't have high standardization level.

The other type is the slider type PMT, in which the frame is also used as supporting structure, but the length of each strut is steady. One end of the strut is connected with the slider moving on a guide way, and the other end is connected with the movable platform. This type of machine tool has not only the advantages of the first type of PMT, but also other beneficial performances. For example, the steady length struts can effectively reduce the error caused by the thermal effect. Another distinct characteristic is the motion of the movable platform along guide way is not coupling with the motion in other directions, which fits to machining long shape parts with complex surfaces. The deficiency of this type of PMT is that the machining dexterity of the cutter in other directions is correspondingly lower than that along guide way. Therefore, although it has the superiority to machining long pats, its capability of machining other type of parts is weaker than that of the first type of machine tool.

By overcoming the shortages of the two types of PMT mentioned above and synthesizing their merits, this invention designs a new machine tool structure with multi-purpose, including cutting, milling, assembling, fluid work machining and measuring. Compared with traditional machine tools, this invention possesses several advantages as simpler structure, better cutter dexterity, faster cutter feed rate, higher accuracy, and better thermal effect calibration. The invention can sufficiently meet the user's demand for three to five axes machine tools.

SUMMARY OF THE INVENTION

The invention designs one type of parallel machine tool structure driven by the slider and extensible strut. It includes:

Two vertical (or one horizontal) guide ways, two active sliders mounted on guide ways, two linear drive units used to move the active sliders, two struts, one movable platform to assemble cutter, one workbench to fix workpiece, one slave slider and one controlled extensible strut.

The main feature of this invention is:

The ends of two struts are hinged together, and the other two ends of them are hinged with the two active sliders respectively. The salve slider is linked with one active slider and moves on the vertical guide way. One end of the controlled extensible strut is hinged with the salve slider, and the other end of it is hinged with the movable platform. The movable platform is hinged with two struts by revolute joints. All the components mentioned above constitute parallel loop chains with three degree-of-freedom. The worktable is independent of the parallel loop chain.

The slave slider can be assembled on different positions on the guide way, and the position of the hinge joining the controlled extensible strut with slave slider can also deviate a desired distance from the guide way. Therefore, the machine tool is able to adapt to different machining situations.

The platform may be added a rotate function. The workbench is composed of the slide table, servomotor, guide way as well as worktable with rotate and move function.

The controlled extensible strut comprises a hollow cylinder with one cover, a servomotor, a hollow linear guide bar, a ball screw and ball a female screw driven by servomotor, a connector connecting the ball female screw and linear guide bar. The hollow cylinder with one cover is assembled with the servomotor, linear guide bar, connector, ball screw and ball female screw one by one.

BRIEF DESCRIPTION OF THE DRAWINGS

The invention is described by the accompanying drawings, in which.

DETAILED DESCRIPTION OF THE INVENTION

According to the drawings, the construction and work principle will be introduced, which are four types of double-guide way PMT and one type of single-guide way PMT.

Figure 1:
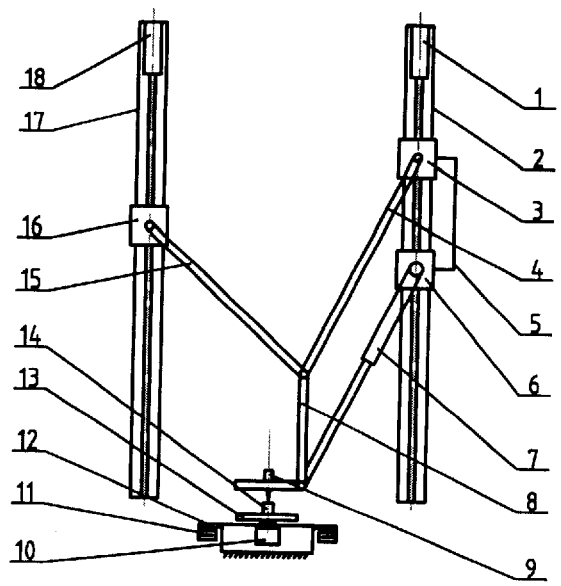
FIG. 1 is the general construction schematic drawing for the first implement action example of the invention.

The first implement example construction is shown in FIG. 1. Struts 4 and 15, controlled extensible strut 7, movable platform 8, sliders 3, 6 and 16, guide ways 2 and 17, make up of a parallel loop chain construction. When movable platform 8 is stressed by a force in any direction, each strut of the loop construction is only pulled or pressed and does not bear the torque. Therefore the stiffness of the construction is high. Because of using frame structure, the total body's weight is light.

Active sliders 3, 6 Slide on vertical guide ways 2, 17, which form a double-guide way and double-slider structure. Because the shortest distance between slider 3 and 16 equals the interval between the two guide ways, the interference among the struts, which easily occurs in the single-guide way and double-slider structure, can be avoided. Furthermore, movable platform 8 is mounted between the guide ways 2 and 17, the force acting on movable platform can be distributed to struts 4 and 15 evenly, which improve the framework's stiffness.

Struts 4, 15 and sliders 3, 16 form a triangular planar movement structure. Because of the stabilization of triangular structure, the joint end of strut 4 and 15 has high stiffness. If the positions of sliders 3 and 16 are changed, the joint end of struts 4 and 15 would change accordingly. The change of the hinge point's position is independent of controlled extensible strut 7 that can be extended to change the angle of the movable platform 8.

One end of movable platform 8 is jointed with controlled extensible strut 7, and the other end is jointed with struts 4 and 15. The control mode presented here has the advantages of both the extensible strut control mode and the slider control mode, which ensures movable platform 8 has good position and orientation ability and high location accuracy.

The positions and orientations of struts 4 and 15 change when sliders 3 and 16 move on vertical guide ways 2 and 17. And then the position of movable platform 8 will change accordingly. Controlled extensible strut 7 controls the position and orientation of the movable platform 8 with its motion in axial direction.

Sliders 3 and 16, driven by linear driving units 1 and 18 respectively, move on vertical guide ways 2 and 17. Slave slider 6 is linked by plate 5 with slider 3 and also moves on guide way 2. As we know, the motion direction of slider is not coupling with other movement directions, therefore this structure has the merit of traditional machine tool based on Cartesian coordinate. Because the nominal lengths of struts 4 and 5 don't change while the machine tool moves, the thermal effect on them along the length direction can be calibrated easily.

In order to increase the stiffness of PMT, struts 4 and 15 take use of plane frames or boards. Movable platform 8 uses bend board structure. And one part of the bend board is connected with the joint point of struts 4 and 15. Servomotor 9 or other devices may be assembled on another part of the bend board. Moreover, the part on which the servomotor 9 is fixed may also be added the function of rotation in order to improve machining range and dexterity of PMT.

Workbench with the function of both movement and rotation is composed of slide table 12, servomotor 10, guide way 11 and rotational table 13. Servomotor 10 drives table 13 along with workpiece 14 to rotate. Slide table 12 moves on guide way 11, whose movement direction is perpendicular to the displacement direction of parallel loop chain structure. Although the workbench is independent of the parallel loop chain structure, the structure characteristics of workbench expand the machining range and adaptability of PMT.

Figure 2:
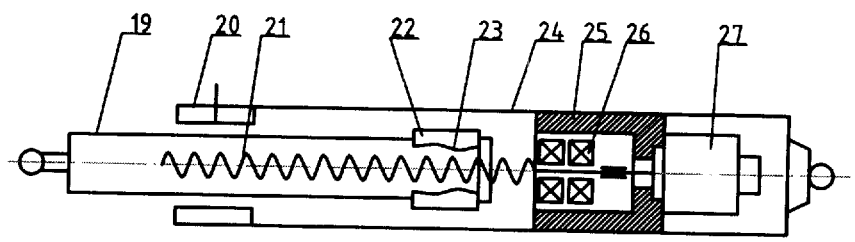
FIG. 2 is a cross-sectional view of the controlled extensible strut.

FIG. 2 is a cross-sectional view of controlled extensible strut 7. In this figure, 27 is the servomotor, which can rotate ball screw 21 fixed on bearing 26. Bearings 26 and 27 are both mounted in case 25. Line guide sleeve 20 is fitted firmly on ectotheca 24, and ectotheca 24 is fixed tightly in case 25, so line guide sleeve 20 can't move relative to ectotheca 24. Because linear guide bar 19 is restricted by line guide sleeve 20, it can only move alone its axis, and can't rotate around the axis. Linear guide bar 19 and ball female screw 23 are fixed together by connector 22, so that ball female screw 23 can't rotate around the axis either. When ball screw 21 rotates, linear guide bar 19 will extend along the axis direction under the driving of ball female screw 23.

In this example, two struts 4 and 15 are both 1100 mm. The length of controlled extensible strut 7 ranges from 845.9 mm to 1309.8 mm. The vertical movement distance of platform 8 is 500 mm. The displacement distances of sliders 3, 6 and 16 along guide ways 2 and 17 all are 1500 mm. The distance between guide way 2 and 17 is 1000 mm. If the length of plate 5 which links slider 3 and 6 is 500 mm, then the horizontal motion range of platform 8 is 1000 mm. When rotate range of servomotor center point on platform 8 is more than 30 degree, the horizontal motion range of platform 8 is 500 mm.

Figure 3:
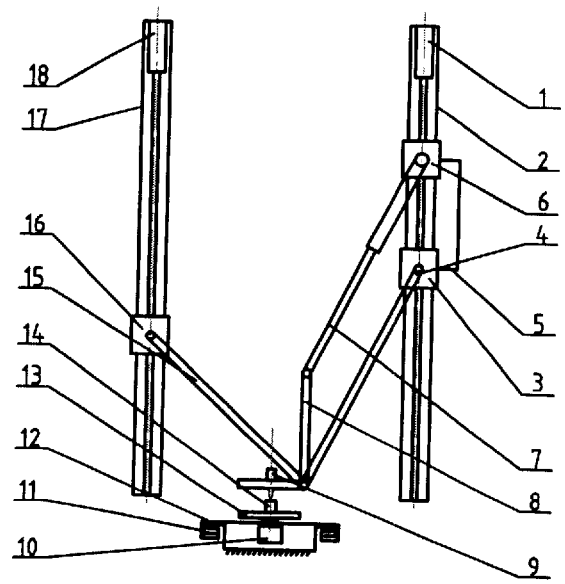
FIG. 3 is the general construction schematic drawing for the second implement action example of the invention.
Figure 4:
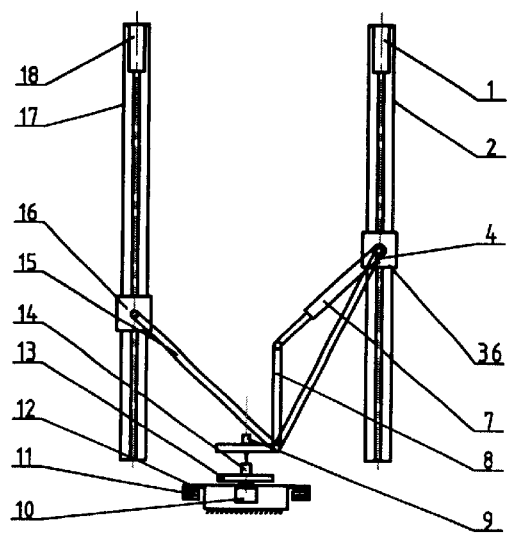
FIG. 4 is the general construction schematic drawing for the third implement action example of the invention.
Figure 5:
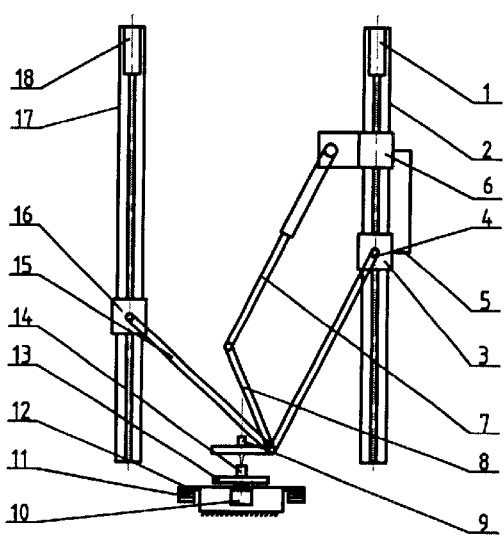
FIG. 5 is the general construction schematic drawing for the fourth implement action example of the invention.

The second, third and fourth implement action example structures are shown in FIG. 3, FIG. 4 and FIG. 5 respectively. These three examples have the same structures, the difference is that their slave sliders 6 are assembled on different positions. The difference can extend the multiplicity and flexibility of the machine tool. The detail illustrations are as follows:

The slave slider 6 of the second implement example action structure is assembled above active slider 3. The slave slider 6 of the third implement example structure is assembled at the same position of the active slider 3. The slave slider 6 of the fourth implement example structure is assembled at the position which deviates a fixed distance from guide way 2. The allowable rotate angle of platform 8 of the fourth structure increases.

Figure 6:
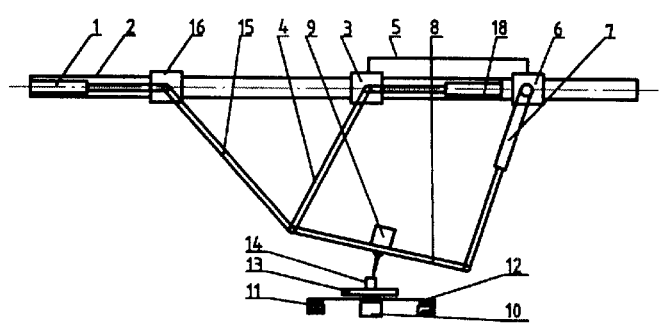
FIG. 6 is the general construction schematic drawing for the sixth implement action example of the invention.

The fifth implement example structure is shown in FIG. 6. Active sliders 3, 16 and slave slider 6 are assembled on the same guide way. The structure of other parts is the same as the above machine tool structure. Because the machine tool frame only employs one guide way, it fits the machining of long shape workpiece.

We claim:

1. An apparatus, comprising:
   first and second guide ways;
   a first active slider disposed on the first guide way and a second active slider disposed on the second guide way;
   a platform;
   a first strut disposed between the first active slider and the platform and a second strut disposed between the second active slider and the platform;

a slave slider disposed on the first guide way and coupled to the first active slider;

a variable length strut disposed between the slave slider and the platform.

2. The apparatus of claim 1, wherein combined movement of the first and second active sliders and the variable length strut provide three degrees of freedom of movement of the platform.

3. The apparatus of claim 1, wherein the platform has first and second ends, the first and second struts being coupled to the first end of the platform and the variable-length strut being coupled to the second end of the platform.

4. The apparatus of claim 1, wherein the first and second struts are pivotally coupled to each other.

5. The apparatus of claim 1, further comprising a plate disposed between the first active slider and the slave slider to couple the first active slider and the slave slider.

6. The apparatus of claim 1, wherein the first and second active sliders and the variable length strut synchronously drive the platform.

7. An apparatus, comprising:

a guide way;

first and second active sliders coupled to the guide way;

a platform;

a first strut mounted between the first active slider and the platform;

a second strut mounted between the second active slider and the platform;

a slave slider coupled to the first active slider and mounted on the guide way;

a variable length strut mounted between the slave slider and the platform.

8. The apparatus of claim 7, wherein the first strut, the second strut, and the platform are pivotally coupled to each other at a single location.

9. The apparatus of claim 7, wherein the first and second struts connect to the platform at a first platform location and the variable length strut connects to the platform at a second platform location, the first and second platform locations being in spaced relation to each other.

10. The apparatus of claims 7, wherein the first active slider is disposed between the second active slider and the slave slider on the guide way.

11. The apparatus of claim 7, wherein combined movement of the first and second active sliders and the variable-length strut provide three degrees of freedom of movement of the platform.

12. The apparatus of claim 7, wherein the first and second active sliders and the variable-length strut synchronously drive the platform.

13. An apparatus, comprising:

first and second guide ways;

a first active slider disposed on the first guide way and a second active slider disposed on the second guide way, the first and second active sliders each driven by an associated linear drive unit;

a platform;

a first strut disposed between the first active slider and the platform and a second strut disposed between the second active slider and the platform, the first strut being pivotally coupled to the second strut and to the platform at a single location;

a slave slider disposed on the first guide way and coupled to the first active slider;

a variable length strut disposed between the slave slider and the platform, wherein the first and second active sliders and the variable length strut synchronously drive the platform.

* * * * *